Oct. 1, 1968  F. DENIG  3,403,643
METHOD AND APPARATUS FOR INCINERATING COMBUSTIBLE
REFUSE, RUBBISH AND MISCELLANEOUS
WASTE ORGANIC MATERIAL
Filed April 14, 1967  5 Sheets-Sheet 1

INVENTOR.
FRED DENIG
BY Sherman H. Barbes
his Attorney

Oct. 1, 1968  F. DENIG  3,403,643
METHOD AND APPARATUS FOR INCINERATING COMBUSTIBLE
REFUSE, RUBBISH AND MISCELLANEOUS
WASTE ORGANIC MATERIAL
Filed April 14, 1967  5 Sheets-Sheet 2

INVENTOR.
FRED DENIG
BY *Sherman H. Barber*
his Attorney

Oct. 1, 1968    F. DENIG    3,403,643
METHOD AND APPARATUS FOR INCINERATING COMBUSTIBLE
REFUSE, RUBBISH AND MISCELLANEOUS
WASTE ORGANIC MATERIAL
Filed April 14, 1967    5 Sheets-Sheet 4
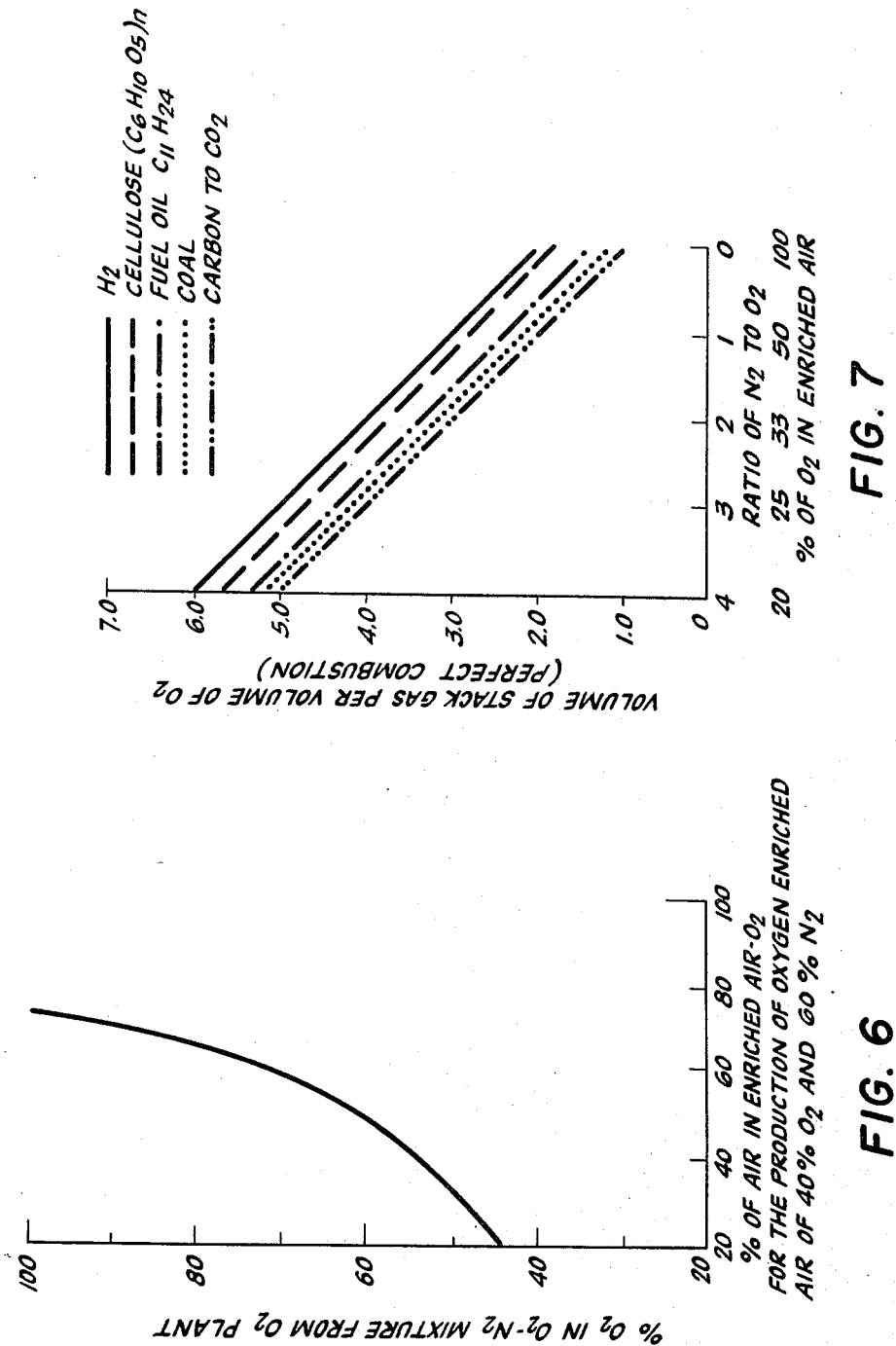
INVENTOR.
FRED DENIG
BY Sherman H Barber
his Attorney 3,403,643
METHOD AND APPARATUS FOR INCINERATING
COMBUSTIBLE REFUSE, RUBBISH AND MISCEL-
LANEOUS WASTE ORGANIC MATERIAL
Fred Denig, Brielle, N.J. (% Koppers Company, Inc.,
440 College Park Drive, Monroeville, Pa. 15146)
Filed Apr. 14, 1967, Ser. No. 630,948
6 Claims. (Cl. 110—10)

ABSTRACT OF THE DISCLOSURE

An arrangement for the efficient disposal of refuse etc. includes an incinerator plant, an oxygen generating plant and an energy recovery plant. The incinerator plant disposes of refuse etc. With oxygen-enriched air of preselected oxygen composition to consume malodorous gases and to insure complete combustion of the refuse etc. An associated oxygen generating plant provides the necessary oxygen of the desired purity. The resulting high flame temperature and small volume of gases resulting from the use of oxygen-enriched air is put to useful work in an energy recovery plant.

Background of the invention

This invention relates to incinerators, and, more particularly, to the method and apparatus for efficiently incinerating combustible refuse, rubbish, and miscellaneous waste organic matter, and for removing smoke and odors from the gases produced by the incineration thereof.

Along with the rapid growth of cities in the United States, as well as in almost all other countries, there have arisen serious problems that are the direct result of the migration of population to the cities, and the direct result of the population explosion within the cities. One such problem is the disposal of the ever increasing enormous amounts of garbage, rubbish, and miscellaneous organic matter generated daily by the population of a city. Smaller cities, of course, have the same problem, but to a lesser degree and generally in proportion to the population density.

Cities that have heretofore used open areas as dumps to amass and burn garbage, rubbish, and miscellaneous organic material, are no longer able to do so because the odors emanating from such burning waste material is obnoxious and unhealthful to the population around such areas, especially to the population who are downwind of the dump area. Also, many cities do not have available and cannot provide more and more land that is needed on which to amass the ever increasing amounts of garbage, rubbish, and miscellaneous organic material.

Besides the obnoxious and unhealthful odors emanating from the burning dump, there is also a smoke and dust problem. The gases and smoke from the burning dump contain, among other things, sulphur dioxide and sulphur trioxide, and when such gases are contacted by snow, rain, and atmospheric moisture, as well as surface moisture, sulphuric acid is produced which causes corrosive damage wherever it contacts residential, business, or municipal properties.

That the combustible refuse which is disposed of daily by the population of a city is heterogeneous is evident, and such may contain bottles of glass or plastic, waste food, animal and vegetable matter, paper in its many forms, wood, rubber products, metal in many forms such as wire (copper, aluminum, steel), automobile parts, furniture, and almost anything that people use or collect and later discard. Such heterogeneous material is discarded to the mercy of the garbage collector who must then disposed of it in accordance with various city, county, state, and federal ordinances. These ordinances, quite naturally, vary from one locality to another locality and even within the same county the ordinances may differ.

Because the health and welfare of the population is intimately involved with the disposal of combustible refuse, what once was considered effective reduction of combustible refuse etc. to ashes, with malodorous gases being released to the four winds, can no longer be tolerated. The health and welfare of the people in present society demands practically complete disposal of combustible refuse, with no malodorous gases emitted to the atmosphere, and a minimal ash residue. Equipment heretofore available is not effective to dispose of combustible refuse etc. in accordance with the stringent modern criteria and standards.

Heretofore, it has been customary to add excess air to incinerators to drop or lower the flame temperature this is carried out in order to limit the flame temperature to the range of 1400° to 1600° F. At such temperature, it is believed that the malodorus gases are eliminated. After the gases transit an expansion chamber more excess air is added to further cool the gases so that the exhaust stack or chimney will not be damaged by the heat of the very gases passing through. However, adding large quantities of excess air creates enormous quantities of gases that must pass through the system. This means that the gas cleaning equipment of prior art incinerators must be of great size to handle the enormous volume of gases generated. The apparatus and method of the present invention accomplish incineration of combustible refuse without generating enormous quantities of waste gases and with a minimum of ashen residue.

How the equipment and method of the present invention effectively disposes of the combustible refuse generated in mass population centers and how the stringent criteria and standards are met is more clearly set forth in the following description, taken in conjunction with the accompanying drawings, which show for the purpose of exemplification, a preferred embodiment of the invention.

Summary of the invention

In an incinerator plant for disposal of combustible refuse etc. oxygen-enriched air is introduced into the combustion zone whereby odorous gases of combustion are burned and more complete combustion of the combustible refuse is achieved. The temperature of combustion is high and the volume of gases is low, thereby enabling the heat generated during incineration to be put to useful work in an energy recovery plant, having reference to the recovery of both radiation and convection heat. An oxygen generating plant associated with the incinerator and the energy recovery plant comprise a unit.

Brief description of the drawings

In the drawings:

FIGS. 6 and 7 illustrate graphically other functional relations between oxygen-enriched air used and volume of gases released from the combustion chamber;

Detailed description

Figure 1:
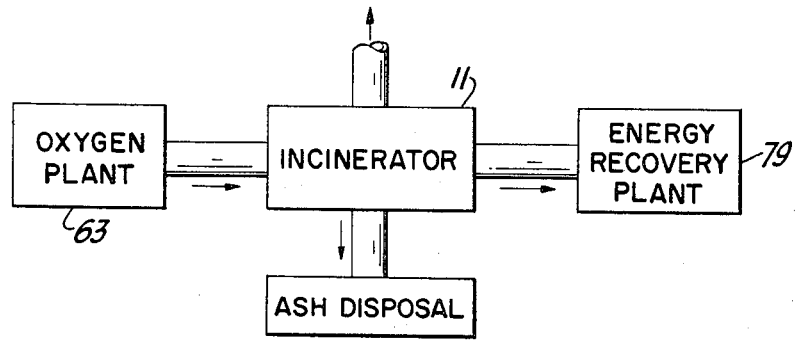
FIG. 1 illustrates schematically apparatus in accordance with the invention.

As used herein, the expression combustible refuse signifies in a generics sense any matter or materials that are rejected as useless and fit only to be thrown away, including offals, carrions, and that which is customarily discarded by human beings in the normal course of daily living such as: garbage, trash, paper in all its forms, waste material and anything that is consumable by fire, but is to be distinguished from metal or junk which may be oxidizable, but is not ordinarily consumable by incinerating at the temperatures herein envisioned.

Referring to the drawings,

FIG. 1 illustrates in graphic form a combination of apparatus in accordance with the invention wherein an incinerator unit for the disposal of combustible refuse is associated with an oxygen generating plant, an energy recovery plant, and a waste disposal unit.

Figure 2:
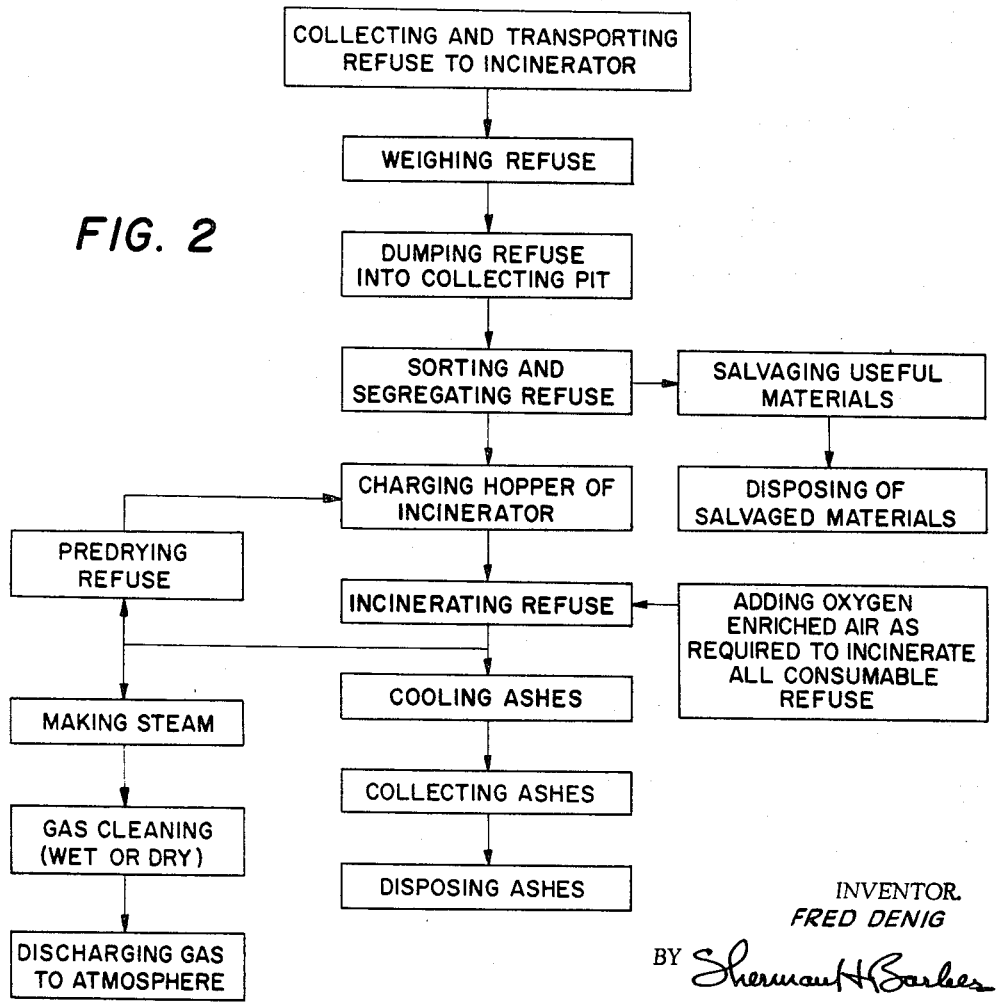
FIG. 2 illustrates a flow chart outlining the steps of the method of the invention.

FIG. 2 illustrates in graphic form steps of the method of the invention which is to consume combustible refuse to such an extent that no obnoxious odors, no particulate matter, no smoke is exhausted to the atmosphere, and the ash contains minimal combustible residue after incinerating.

According to the invention, combustible refuse is collected and transported by truck or other conventional means to a centrally located incinerator facility or plant 11 (FIG. 3) serving a given industrial and/or residential area. At the incinerator 11, the truck 13 rolls onto a conventional platform scale 15 located in a scale house 17, and the truck with its contents is weighed to determine the net weight of the refuse carried which, at this point, may contain both combustible refuse and non-combustible metal. Thereafter, the refuse is dumped into a collecting or storage pit 19 that is capable of holding a large enough quantity of refuse so that operation of the incinerator plant 11 may be practically continuous. In some regions, that is in cities of smaller size, the operation of the incinerator plant 11 may be scheduled for a particular number of days per week; but the capacity of the storage or collecting pit 19 should be large enough to hold sufficient refuse to insure a reasonably steady rate of disposal during the operation of the plant for the preselected scheduled operating period. The storage or collecting pit 19 should also be large enough to hold the excessive quantities of refuse produced, for example, during the Christmas season when an excessive quantity of paper and paper products are discarded as refuse.

In most operations, it is desirable to provide separate storage or collecting pits (not shown) in which particular kinds of refuse are segregated. For example, one collecting pit may contain only household and restaurant type of garbage, and another pit my contain only cellulose products such as paper, wooden boxes, and highly combustible other refuse etc. Thus, it will be possible to charge the incinerator plant with a particular type of combustible refuse when the occasion requires, and the character of the material charged to the incinerator may be varied to obtain a reasonable mixture of fast consumable refuse, such as cellulose products, and slower consumable material such as waste vegetable and animal matter.

Very often the refuse entering the disposal plant is fed onto conveyor belts either feeding the collecting pits 19, or belts 21 which feed the material to a hopper 23 at the top of the incinerator itself. As the refuse travels on the conveyor belt 21 on its way to the incinerator proper, the refuse passes under one or more electromagnets 24 which attract and cull non-consummable ferrous refuse material from the other combustible refuse. Non-ferrous other refuse, such as copper, copper and aluminum wire, bronze, brass and aluminum scrap metal and the like may be removed manually.

Figure 3:
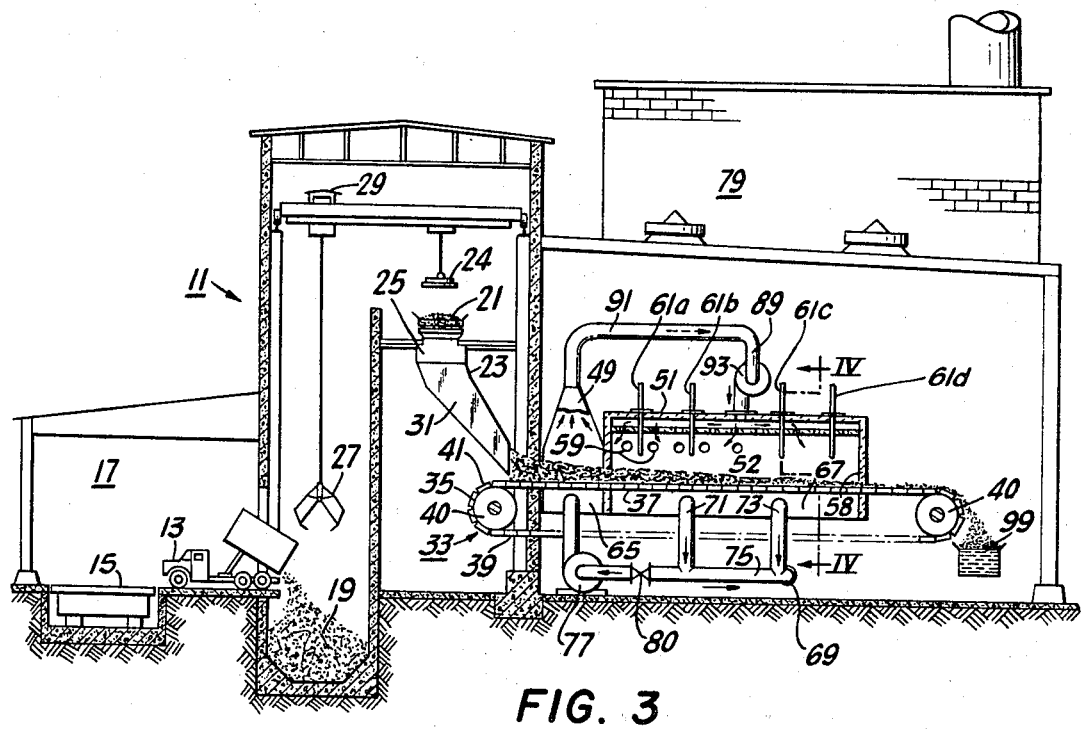
FIG. 3 illustrates schematically a longitudinal section of an incinerator plant in accordance with the invention.

In the incinerator plant 11 illustrated in FIG. 3, the refuse is lifted from the storage pit 19 by a bucket 27 suspended from an overhead travelling crane 29, and it is dumped onto the conveyor belt 21. The material on the conveyor belt passes beneath one or more electromagnets 24 which remove the ferrous material from the refuse, and the combustible refuse then gravitates into a hogging machine 25 which disintegrates larger pieces of the combustible refuse, and breaks it up into reasonable sized particles. From the hogging machine 25, the combustible refuse gravitates into a hopper 23 that communicates with an inclined chute 31 leading to one end of a travelling incinerating grate 33 disposed beneath the chute 31.

The travelling incinerating grate 33, illustrated schematically in FIG. 3, comprises an endless belt 35 with a top run 37 and bottom run 39 that are looped around sprocket wheels 39 at both ends; one of the wheels 39 being powered in a conventional manner. The endless belt 35 (FIG. 4) is fashioned from refractory bricks 41, having draft holes therein, that are supported between sectional side angular plates 43. The side angular plates 43 are provided with rollers 45 that bear on rails 47 extending alongside of the grate 33 for the purpose of supporting the top and bottom runs.

As may be noticed in FIG. 3, combustible refuse collects on the travelling grate 33 and passes under a first hood 49 and a second hood 51. As the combustible refuse passes under the first hood 49, it is subjected to an upward flow of heated gases which evaporate a portion of the surface moisture in the combustible refuse, thereby drying it to some extent and enhancing the final oxidation of it.

Figure 4:
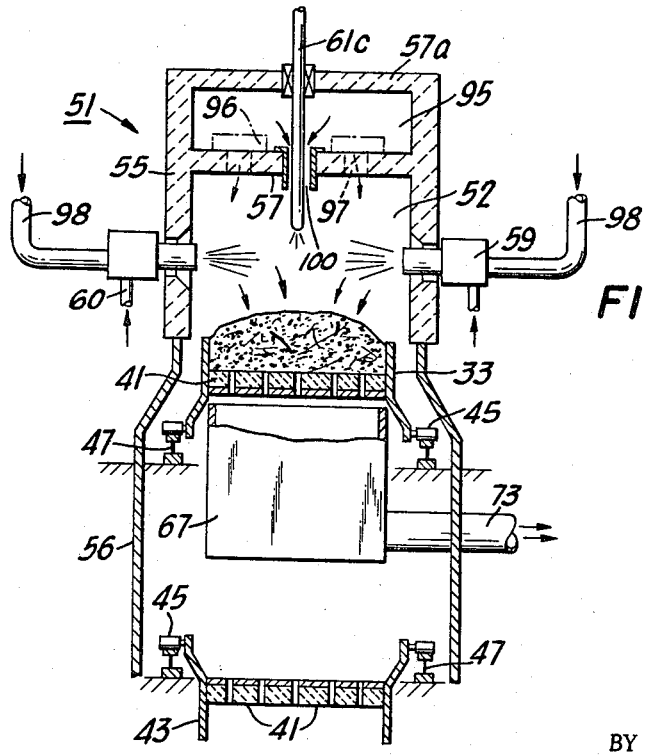
FIG. 4 is a view along line IV—IV of FIG. 3.

FIG. 4 illustrates schematically that the second hood 51 comprises refractory lined side walls 55 having a first roof 57 at the top extending between end walls 58 (FIG. 3) and an open bottom. The side walls 55 are supported on shaped structural steel side plates 56 which surround in spaced apart relation the grate 33. The side walls 55 extend generally above the level of the first roof 57 to a second roof 57a which also connects the side walls 55 and is spaced apart from roof 57, thereby forming an open manifold space between the roofs. Further, the side walls 55 support a plurality of horizontally directed fuel burners 59 to which a mixture of fuel from outside sources is delivered by means of conduits 60. As the combustible refuse passes into the second hood 51, the refuse is ignited by the flame generated at the burners 59 and the combustion ensues in combustion zone 52, more or less rapidly depending on the moisture content and the general composition of the refuse.

Both of the roofs 57, 57a support a plurality of lances 61 (FIG. 1) that may be raised or lowered, as the occasion requires, and to which oxygen-enriched air is fed from a source of supply such as the adjacent oxygen plant 63 (FIG. 1) from which oxygen-enriched air, having an oxygen content in the range of 25–50 percent is derived.

The oxygen plant may be of conventional design, as oxygen can be produced in many ways such as by liquefying air, electrolysis of water and in other ways known to those skilled in the art. Liquefication of air is an important way to make oxygen which, for example, involves air purification, partial liquefication of such air by regenerative heat exchange, and separation into oxygen and nitrogen by fractional distillation.

That oxygen in such proportion is efficient in consuming odors given off by the burning of combustible refuse etc., and promoting complete combustion may be readily shown. The obnoxious odors carried out by chimneys of conventional incinerators are due almost entirely to the incomplete combustion of the combustible refuse. As a matter of fact, the heat of the incinerating combustible refuse will distill many strange organic compounds that can be destroyed only by complete combustion at high temperatures. The use of oxygen-enriched air produces the high temperatures required, and the heated waste gases generated in the combustion zone 52 may, in turn, be put to more efficient use by diverting some of these gases to preheat and dry the incoming combustible refuse before it enters the combustion zone 52, and by diverting the remainder of the gases into an energy recovery unit 79.

Figure 5:
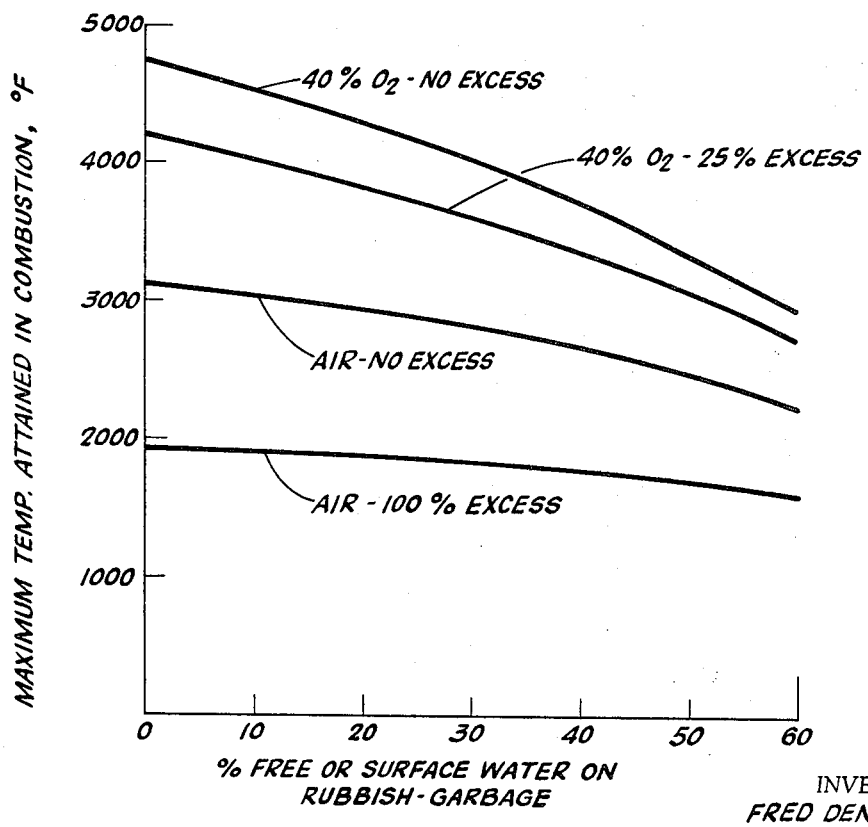
FIG. 5 illustrates graphically relations between moisture content of the combustible refuse and the flame temperature attained during combustion.

FIG. 5 illustrates graphically the relation between the maximum combustion gas temperature and the moisture content of the combustible refuse in the presence of four different atmospheres. The curves of FIG. 5 are based on the assumption that the combustible refuse is principally cellulose, represented by the chemical relation $C_6H_{10}O_5$. It will be noted that the maximum flame temperature is attained in an atmosphere of oxygen-enriched air having an oxygen richment of 40 percent and, the flame temperature is well above the temperature reached in an atmosphere of air without excess and air with 100 percent excess. It is significant to note that at an assumed refuse moisture content of 40 percent, there is a difference of about 1600° F. between the flame temperature attained using 100 percent excess air (the lower value) and using 40 percent oxygen-enriched air with a 25 percent excess. This significant difference in flame temperature accounts in part for the more effective results of the method of the invention and the effectiveness of the apparatus of the invention.

FIG. 6 illustrates graphically the relation between the percentage of air in a 40–60 oxygen-nitrogen ratio in oxygen-enriched air, and the percentage of oxygen required in an oxygen-nitrogen mixture to produce a final 40–60 oxygen-nitrogen ratio that is desirable for use in the incinerator of the present invention.

FIG. 7 illustrates graphically the volume of stack gases at standard atmospheric conditions, 60° F. temperature and 30″ Hg barometric pressure, per volume of oxygen used, when utilizing various proportions of oxygen in the oxygen-enriched air.

Thus, the use of oxygen-enriched air creates a significantly smaller volume of stack gases that have to be handled in associated gas cleaning plants, and, accordingly more efficient gas cleaning is effected.

In order to show some idea of the possible reduction in the volume of gases generated that can be attained by using oxygen-enriched air which produces more complete combustion, the following simplified calculations are shown:

It is well known that air consists of 20.9 percent oxygen and 79.1 percent nitrogen, not considering inert gases such as argon, neon, etc., which also exist in the air in very small quantities. However, to simplify the example, air is assumed to consist of 1 part oxygen and 4 parts of nitrogen. As an example, a member of the paraffin family $C_nH_{2n+2}$ is utilized: light fuel oil is burned with air in accordance with the following relation $C_{11}H_{24}+17O_2+68N_2=11CO_2+12H_2O+68N_2$.

Thus, 85 volumes of air create 91 volumes of stack gas.

When using enriched air with 40 percent oxygen and 60 percent nitrogen content, then:

$C_{11}H_{24}+17O_2+25.5N_2=11CO_2+12H_2O+25.5N_2$

Or 42.5 volumes of oxygen-nitrogen mixture will generate 48.5 volumes of stacked gas. Thus, the relative volumes of stack gas with enriched air, and with air only is in ratio of 48.5:91 or 53.3 percent. In other words, there would be a reduction of 46.7 percent in the stack gas volume by using oxygen-enriched air, having a 40 percent oxygen and 60 percent nitrogen content.

In similar fashion cellulose (paper, wood products, and the like) will form 35 volumes of stack gas per mole when burned with air, and 20 volumes of stack gas when burned with a mixture of 40 percent oxygen and 60 percent nitrogen. In this condition, there is a reduction of 43 percent in the amount of stack gas generated whereas, in the case of light fuel oil, there is a reduction of 46.6 percent based upon the mode of gas generated as set forth hereinabove.

Now, then, the amount of oxygen consumed by weight per ton of paraffin ($C_{11}H_{24}$) may be found from the relation $C_{11}H_{24}:17O_2=1$ ton:$x$. Knowing the molecular weight of paraffin to be 156 and the molecular weight of $17O_2$ to be 554, then $x=544/156$ or 3.5 tons of oxygen. Now, 3.5 tons of oxygen are the equivalent of 84,000 cu. ft. of oxygen and the volume of air containing this amount of oxygen is equal to 84,000×5 or 420,000 cu. ft. of air. The perfect combustion of fuel oil calculated at 60° F. and 30 inches of mercury barometric pressure, may be shown in the following table.

| O₂ Source | Per Ton Fuel Oil | |
|---|---|---|
| | Volume of Waste Gas at Standard Conditions | Volume of Waste Gas at 520° F. |
| Air | 500,000 | 1,000,000 |
| Air Enriched to 33% O₂ | 350,000 | 700,000 |
| Air Enriched to 50% O₂ | 235,000 | 470,000 |
| Pure Oxygen | 132,000 | 264,000 |

This table shows the significant reduction in the total volume of waste gases emanating from burning combustible refuse in an oxygen-enriched atmosphere, and how significant the volume change is as the percent of oxygen increases.

To estimate the volume of stack gas passing out of the stack into the atmosphere, it is necessary to know the temperature of the stack gas. For example, if the stack gas temperature is 520° F., then the above volumes of stack gas would be calculated by the absolute temperature ratio of gas at 520° F. (1040° absolute temperature) and gas at 60° (or 520° absolute) such as:

$$460+580/460+60=1040/520=2$$

Thus, the great advantage derived from the use of oxygen-enriched air, in accordance with the invention, is the reduction in volume of stack gases. As indicated above, the 84,000 cu. ft. of oxygen can be derived from 420,000 cu. ft. of air, using air as the sole source of the oxygen. However, the cost of high purity oxygen is so great, compared with air enriched with oxygen, that the use of pure oxygen is virtually prohibited. As a practical matter, oxygen-nitrogen mixtures can easily be made at an economical cost per ton of oxygen, and the use of such mixtures will be significantly more important and more advantageous than the use of air only as an oxygen source. FIG. 5 illustrates the significant increase in flame temperature achieved when using oxygen-enriched air having various percent oxygen content.

From the foregoing, it will be understood that considerable heat is generated in the combustion zone 52 during the oxidation of the combustible refuse, wherefore, there is provided beneath the travelling grate 33 a plurality of collecting ducts 65, 67, that collect and remove the hot gases from the combustion zone 52. Associated with the respective ducts 65, 67, are conduits 71, 73 that communicate with a main horizontal conduit 75. The main conduit 75 communicates at one end with a suction fan 77, and at the other end with another conduit or conduits 69 leading to the energy recovery unit 79, which may have the form of a conventional waste heat boiler installation that generates steam and electric power.

In the main conduit 75 there is a damper 80 or other suitable flow control device to regulate and direct a proportionate part of the hot gases upwardly through the incoming wet combustible refuse, gravitating onto the grate 33, to evaporate some of the surface moisture from the refuse. The remaining portion of the hot gases are diverted by the damper 80 through the conduit 69 into the energy recovery unit 79.

It will be noticed from FIGS. 3 and 4, that the air discharging from the fan at 93 enters the space between the roofs 57, 57a which serves as a manifold to distribute the air throughout the length of the second hood 51 and of combustion zone 52. The first roof 57, it will be noticed, has a plurality of perforations located in a plurality of places, as at 97.

Each such perforation is associated with a slidable cover 96 which may be moved laterally on the upper surface of the roof 57 to close or partially close or to open the perforations 97. The perforations 97 admit aspirating air from the manifold into the combustion zone 52 when the side wall burners 59 alone are operating.

Further, when desirable, a part of the gases discharged from the fan 93 may be diverted to the burners 59 to provide the aspirating air needed to burn the fuel being used. Such aspirating air is conducted to the fuel burners 59 through conduits 98 (FIG. 4).

While the apparatus and the method of the invention may be expected to incinerate practically all of the combustible refuse that gravitates onto the travelling grate 33, there will be some ash residue after combustion of the refuse. Such ash, when it leaves the combustion zone within the second hood, is hot and the ashes discharge from the travelling grate 33 into a trough 99 containing water that cools the ashes. Suitable ash removal equipment, such as a drag scraper (not shown), may be used to remove the ash residue from the trough 99 and deposit it in a residue receiving pit or tank, or the ash residue may be disposed of in any other appropriate manner.

During the incineration of the combustible refuse in the combustion zone 52, the oxygen-enriched air is admitted through one or more of the lances 61 that project through the roofs 57, 57a. The lances 61 slide in a suitable sleeve in the roof 57a forming an airtight seal around the lance so that no ambient air enters the manifold 95 and no gases escape from the manifold. The lances 61, however, freely pass through lined apertures 100 in the roof 57 and these apertures 100 serve as aspirating apertures to admit gases from the manifold 95 to the combustion chamber 52 when the lances are being operated.

In operation of the incinerator plant, the combustible refuse gravitates onto the travelling grate 33 at the discharge end of the chute 31 and is carried through the predrying first hood 49 wherein some portion of the surface moisture is evaporated by the hot gases passing upwardly through the duct 65 and hood 49. Thence, the partially dried combustible refuse enters the combustion zone 52 within the second hood 51.

As soon as the cold combustible refuse enters the combustion zone 52, it is ignited by the flames produced at the sidewall burners 59. Now, ignition may proceed quite rapidly or not depending upon the composition and condition of the combustible refuse.

Figure 9:
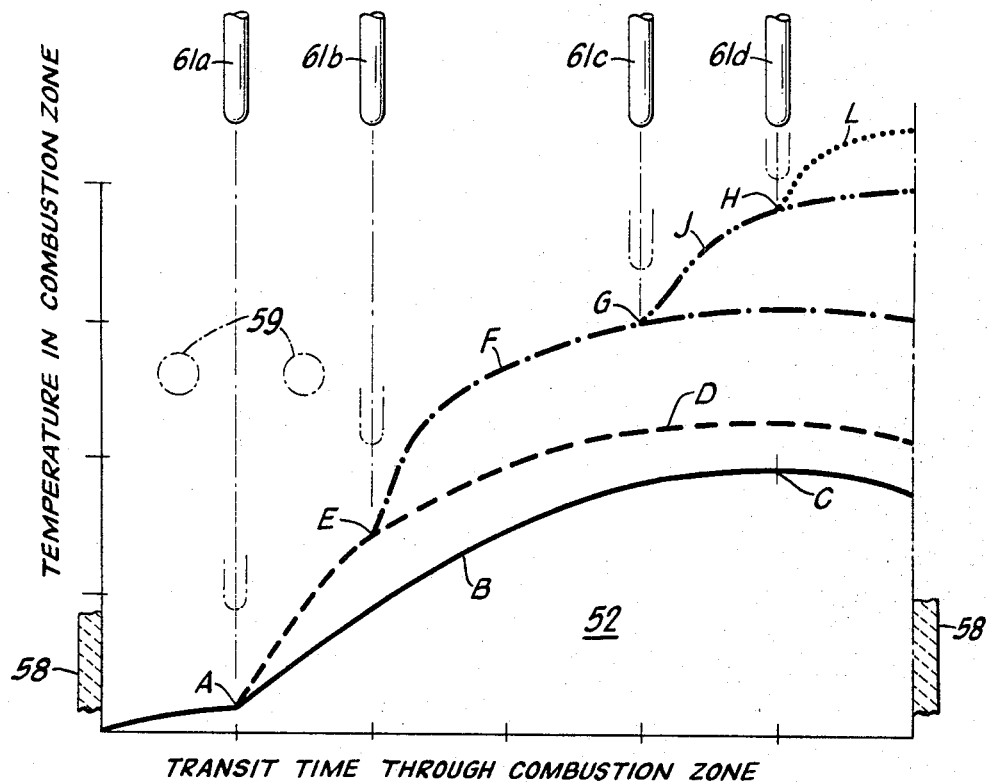
FIG. 9 illustrates graphically the relation between temperature and transit time of the refuse in the combustion zone.

FIG. 9 illustrates graphically several conditions that may exist in the combustion zone. The fire wall 58 at the left hand side represents the wall separating the first 49 and second 51 hoods and is the entry point to the combustion zone 52.

At this entry point, the combustible refuse may be expected to have a low temperature, but ignition commences and the temperature of the refuse rises rather slowly until most of the surface moisture is driven off. The grate 33 moves from left to right, as shown in FIGS. 3 and 9, and at point A (FIG. 9) all of the surface moisture has been converted to steam. Then, the combustible refuse incinerates and attains temperatures lying on one of the curves B, D, F, J or L, depending upon whether or not one or more lances 61 are activated to inject oxygen-enriched air into the combustion zone and into the refuse to enhance combustion.

If the combustible refuse passing through the incinerator one period of time is easily incinerated, then the temperature lies along curve B, and no oxygen-enriched air is used to achieve complete combustion. The refuse in this condition attains a maximum temperature at a point C, well along the length of the combustion zone and near the exit firewall 58, at the right-hand end of FIGS. 3 and 9.

Now, if the partially predried consumable refuse at another time is not readily combustible under the flame condition of the side wall burners 59, then oxygen-enriched air, having an oxygen content in the range of 25 to 50 percent, may be injected into the combustion zone at point A through the lance 51a. The temperature of the refuse will then rise quickly and follow generally curve D that becomes generally parallel to curve B as the refuse approaches the exit firewall 58.

In another situation, the partially burned refuse may not be incinerating sufficiently well to produce complete combustion, wherefore, the second lance 61b may be activated to inject oxygen-enriched air into the combustion zone at point E. Enhanced combustion occurs from point E onward and the refuse burns at temperatures along curve F, that also becomes generally parallel to the curves B and D.

In like manner, the lances 61c and 51d may be activated at points G and H as the situation requires and the temperature of the burning refuse will follow respectively curves J and L respectively.

It should be noted that the temperature along curves J and L are very high and it may be expected that combustion of the most stubborn refuse will be complete by the time the refuse and grate reach the exit wall 58 at the right-hand end of FIGS. 3 and 9.

In any installation, there may be provided one or more visual aids (not shown) to inspect the interior of combustion zone 52 to determine the need to activate one or more of the lances. Also, in some installations electro-mechanical aids may be employed to accomplish the same purpose, as a substitute for or in supplement of the visual aids.

Figure 8:
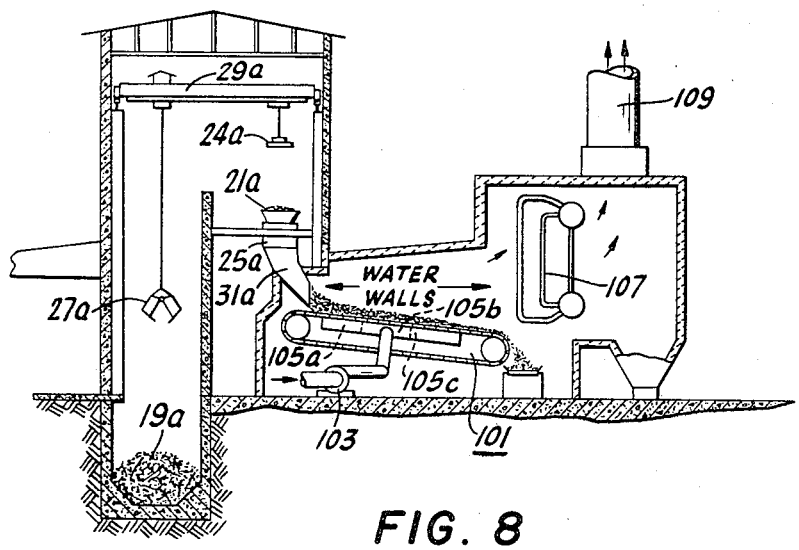
FIG. 8 is a schematic arrangement of another embodiment of the apparatus of the invention.

FIG. 8 illustrates schematically another embodiment of the apparatus of the invention wherein, the combustible refuse is collected in a similar pit 19a and is moved therefrom by a bucket 27a suspended from an overhead travelling crane 29a as described hereinbefore. The refuse is carried by a conveyor belt 21a past one or more electro-magnets 24a and the ferrous metal is culled from the refuse as before. The combustible refuse gravitates into a similar hogging machine 25a and from there through a chute 31a onto a travelling grate 101.

The travelling grate 101 is similar in many ways to the travelling grate 33, but principally the grate 101 differs in that with the grate 101 there are no associated hoods such as the hoods 49, 51 and 53. In the grate 101, the draft movement is upward as contrasted with the downward draft in the grate 33, and the oxygen-enriched air can be and preferably is fed into an induced draft fan 103 from where it flows upwardly into zones 105a, 105b, 105c located below the upper run of the grate 101 of whatever type it may be.

It is to be noted that in the embodiment of the invention shown in FIG. 8, the flow of oxygen-enriched air is upward which is in contrast to the generally downward flow of the oxygen-enriched air in the embodiment of the invention shown in FIG. 3, particularly in the combustion zone 52. However, in some instances the arrangement of lances 61a, 61b, 61c, 61d may be horizontal or directed generally upward from a location below the upper run of the grate 33.

Thus, the incination of the combustible refuse radiates heat to the waterwalls (FIG. 8) and the flames generated by the burning refuse pass across the external surfaces of the tubes of a boiler arrangement 107 wherein steam is generated. Thereafter, the gases pass out of the incinerator through a stack 109 and to gas cleaning apparatus (FIG. 1).

A plurality of burners (not shown) may be installed in the incinerator that are similar to the burners 59 described herein. These burners may be operated periodically to make sure that the combustible refuse remains ignited and that the refuse is ultimately consumed in the presence of the oxygen-enriched air.

Figure 10:
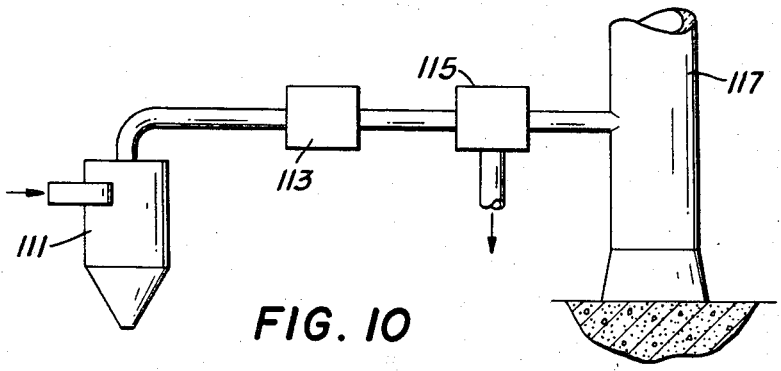
FIG. 10 illustrates schematically another embodiment of a portion of the apparatus of FIG. 8.

FIG. 10 illustrates schematically a further embodiment of a portion of the apparatus of FIG. 8. In the apparatus of FIG. 10, the gases emanating from the combustion zone first pass through a cyclone separator 111 or a plurality of such separators and thence the particle-free gases pass through an energy recovery unit 113, which may be a steam boiler installation such as is shown in FIG. 8. The heat given up by the gases to the water in the boiler tubes generates steam and the cooled gases then pass through a gas cleaning unit (wet or dry type) 115. The dry type of gas cleaner may be an electrostatic precipitator or a plurality of such precipitators. From the gas cleaner unit the gases pass into a conventional stack 117 which may be the same as the stack 109 of FIG. 8.

The praticles removed from the gases passing through the separator 111 and the gas cleaning unit 115 may be removed and disposed of in a conventional manner.

A feature of the invention is that the enormous amount of malodorous waste gases, which are presently being discharged to atmosphere from present day incinerator plants, are burned in the incinerator arrangement of the present invention and no malodorous gases are discharged to atmosphere.

A feature of the invention is the use of lances to inject oxygen-enriched air against and into the burning refuse to enhance complete combustion thereof.

A feature of the invention is the combination of an incinerator plant and apparatus capable of generating continuously the required quantity of oxygen-enriched air, having the desired proportion of oxygen, and an energy recovery unit that converts the heat generated in disposing of the refuse etc. into useful work.

A feature of the invention is that the oxygen-enriched air injected into the combustion zone produces flame temperatures high enough to consume the most stubborn refuse with the result that complete combustion is achieved.

While the invention has been described herein with a certain degree of particularity, it is understood that the present disclosure has been made only as an example and that the scope of the invention is defined by what is hereinafter claimed.

What is claimed is:

1. The combination comprising:
   (a) means for removing nitrogen from air to form oxygen-enriched air having an oxygen content in the range of 25 to 50 percent;
   (b) incinerator apparatus for burning combustible refuse such as garbage and trash in a combustion zone, means for supplying said oxygen-enriched air to said combustion zone to maintain therein an atmosphere in which said refuse is effectively consumed and concentrated hot combustion gases are thereby produced; and
   (c) an energy recovery unit receiving said hot combustion gases from said incinerator and converting the heat of said gases into useful work.

2. The invention of claim 1 including:
   (a) at least one lance for carrying said oxygen-enriched air into said combustion zone whereby the burning of said refuse is accelerated and malodorous gases produced by the partial burning of said refuse are consumed.

3. The invention of claim 1 wherein:
   (a) means is provided for delivering said oxygen-enriched air to at least one zone beneath the refuse passing through said combustion zone, and wherein means is provided for directing the oxygen-enriched air, so delivered, upwardly through the refuse within said combustion zone.

4. An incinerator for disposing of combustible refuse such as garbage, and trash comprising:
   (a) a grate having means for advancing refuse progressively in a predetermined direction while supported on the upper surface of said grate, said grate having a plurality of openings extending through said grate and opening into the upper and lower surfaces of said grate;
   (b) a first hood positioned above a portion of the upper surface of said grate, and a first conduit beneath said grate and communicating through the openings in said grate with said first hood;
   (c) a second hood adjacent said first hood and covering a portion of the upper surface of said grate, and a second conduit beneath said grate communicating through said openings with said second hood, said second hood having walls defining a combustion zone through which said grate and the refuse thereon passes;
   (d) a plurality of burners mounted in the walls of said second hood adapted to burn a fuel mixture to ignite said refuse within said combustion zone;
   (e) a plurality of lances mounted in said second hood adapted to convey into said combustion zone oxygen-enriched air which accelerates the combustion of said refuse thereby generating heat and hot combustion gases within said combustion zone;
   (f) means for exhausting the hot combustion gases generated in said combustion zone through said second conduit; and
   (g) means for diverting a portion of said exhausted hot combustion gases into said first conduit so that said gases pass upwardly through said refuse and evaporate a portion of the surface moisture therefrom, said moisture laden gases thereafter passing into said combustion zone, with said diverting means directing the remainder of said hot combustion gases into an energy recovery unit.

5. The method for incinerating combustible refuse such as garbage and trash comprising the steps:
   (a) passing said combustible refuse through a combustion zone;
   (b) igniting and partially incinerating said refuse thereby generating heat and malodorous gaseous products of combustion;
   (c) removing nitrogen from air to form oxygen-enriched air having an oxygen content in the range of 25 to 50 percent;
   (d) injecting said oxygen-enriched air into said combustion zone to accelerate incineration of said refuse and the malodorous gaseous products of combustion; and
   (e) passing the residual gaseous products of combustion into energy recovery apparatus.

6. The method for incinerating combustible refuse such as garbage and trash comprising the steps;
(a) passing refuse into and through at least one combustion zone and igniting said refuse;
(b) removing nitrogen from air to form oxygen-enriched air having an oxygen content in the range of 25 to 50 percent and delivering said oxygen-enriched air beneath the ignited refuse passing through at least one combustion zone;
(c) passing said oxygen-enriched air upwardly through said ignited refuse whereby the incineration of said refuse is enhanced and heat is generated and the malodorous products of combustion are burned; and
(d) passing the residual gaseous products of combustion through a heat recovery unit wherein steam is generated.

References Cited
UNITED STATES PATENTS

| | | | |
|---|---|---|---|
| 2,026,969 | 1/1936 | Flynn | 110—15 |
| 2,040,416 | 5/1936 | Upson | 110—8 |
| 2,057,681 | 10/1936 | Harrington | 110—15 |
| 2,764,109 | 9/1956 | Grosse | 110—1 |
| 2,865,344 | 12/1958 | Firl | 110—1 X |
| 2,874,655 | 2/1959 | Wolfram | 110—75 XR |
| 2,925,055 | 2/1960 | Miller et al. | 110—7 |
| 3,057,308 | 10/1962 | Knipping | 110—8 |
| 3,101,683 | 8/1963 | Yonner | 110—8 |
| 3,267,890 | 8/1966 | Zinn et al. | 110—18 |
| 3,357,380 | 12/1967 | Siracusa | 110—8 |

JAMES W. WESTHAVER, *Primary Examiner.*